(No Model.)

A. T. BARTLETT.
PASTRY COOKING TESTER.

No. 248,389. Patented Oct. 18, 1881.

Witnesses:
J. W. Kalb
Andrew Kline

Inventor:
Alphonse T. Bartlett
pr. Edw. W. Down
Atty.

United States Patent Office.

ALPHONSE T. BARTLETT, OF MILLER'S FALLS, MASSACHUSETTS.

PASTRY-COOKING TESTER.

SPECIFICATION forming part of Letters Patent No. 248,389, dated October 18, 1881.

Application filed March 22, 1881. (No model.)

*To all whom it may concern:*

Be it known that I, ALPHONSE T. BARTLETT, of Miller's Falls, in the county of Franklin and State of Massachusetts, have invented a new and useful Improvement in Pastry-Cooks' Testers and Holders; and I do hereby declare the following to be a full and clear and exact description of the same, reference being had to the accompanying drawings, which form a part of this specification.

My invention relates to an improvement in the utensil used by cooks to try or test their articles, when cooking, to ascertain whether the same are properly baked or not.

Figure 1:
Figure 2:
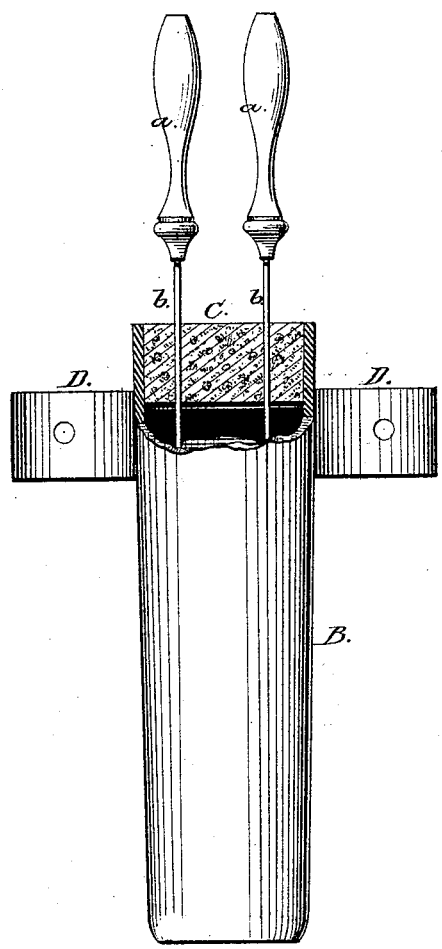

In my drawings, Figure 1 is a view or elevation of one of the testers. Fig. 2 is an elevation of the holder, partly broken away, showing two of the testers fixed therein.

Similar reference-letters denote like parts in both figures.

Referring to drawings, $a$ represents the handle, and $b$ the needle, of the tester. B is the body, C the elastic top, and D the bracket, of the holder.

The testing-needle $b$ is fitted into the handle $a$ for convenience, and when used is thrust into the cake, bread, or article being cooked. If the dough is not well baked some particles will adhere to the testing-needle, while if properly cooked the testing-rod will be free from dough when withdrawn.

It has been customary for cooks to use a small splinter of wood or some fibrous substance for the purpose of testing; but such do not act as efficiently as a metal substance. I therefore use a metal rod in testing, although such material is not essential.

The holder is affixed to the wall or some convenient part of the room or cooking-range where it will be handiest for use. The holder B is preferably made of wood, and is constructed partially hollow. In the top is inserted a cork, C, or other elastic material, into which the testing-rod B is thrust after being used. The elastic substance C enables the rod to be easily inserted, and it also, at the same time, removes all dough from the tester. By this simple arrangement the implement is always at hand for ready use, and always clean and effective.

What I claim as my invention is—

1. A holder for pastry-testers, composed of the body B, provided with an elastic top, C, as and for the purpose specified.

2. The household article described, composed of the tester formed of needle $b$ and handle $a$, and the receiver for same, composed of the body B, provided with a top, C, of elastic material, and bracket D, substantially as and for the purpose set forth.

ALPHONSE T. BARTLETT.

Witnesses:
B. S. PARKER,
GORHAM D. WILLIAMS.